United States Patent [19]

Muramatu et al.

[11] 3,764,973

[45] Oct. 9, 1973

[54] TRAFFIC SIGNAL CONTROL DEVICE

[75] Inventors: Akira Muramatu; Tatsuro Ichihara, both of Kyoto, Japan

[73] Assignee: Omron Tateisi Electronics Co., Kyoto, Japan

[22] Filed: Apr. 14, 1971

[21] Appl. No.: 133,882

[30] Foreign Application Priority Data

Apr. 14, 1970 Japan ................................ 45/32537

[52] U.S. Cl. ................................................ 340/40
[51] Int. Cl. ................................................ G08g 1/07
[58] Field of Search ........................................ 340/40

[56] References Cited

UNITED STATES PATENTS 3,302,170 1/1967 Jensen et al. ...................... 340/40 X
3,363,185 1/1968 Sanderson et al. ............... 340/40 X

*Primary Examiner*—William C. Cooper
*Attorney*—Craig, Antonalli, Stewart & Hill

[57] ABSTRACT

A traffic signal control device for applying signals for switching signals at a multiplicity of intersections. The traffic signal control device comprises a core memory in which a group of variable data such as elapsed times, steps and traffic information, a group of fixed data such as initial portions, unit extensions and maximum green signal periods, and a group of instruction data are stored; a pulse generator for generating pulses for varying the values of the variable data; and a control means for incrementing the data of elapsed time, comparing the incremented data to a corresponding fixed data, and incrementing the data of step when the value of the elapsed time equals with the corresponding fixed data.

13 Claims, 4 Drawing Figures

INVENTORS
AKIRA MURAMATU
and TATSURO ICHIHARA

BY Craig, Antonelli & Hill
ATTORNEYS

INVENTORS
AKIRA MURAMATU
and TATSURO ICHIHARA

BY Craig, Antonelli & Hill
ATTORNEYS

Fig. 3

| ADDRESS | DATA | | |
|---|---|---|---|
| 0000000 | 00001100001100 | L | TC |
| 0000001 | 00100000000000 | AXC | |
| 0000010 | 00011100001100 | ST | TC |
| 0000011 | 00001100001101 | L | SC |
| 0000100 | 01000001000000 | SXA | IXR |
| 0000101 | 00001000000000 | L | IG(SC) |
| 0000110 | 01011100001100 | S | TC |
| 0000111 | 01100000000000 | TA | |
| 0001000 | 10000000101100 | B | |
| 0001001 | 10000000001011 | B | |
| 0001010 | 10000000001011 | B | |
| 0001011 | 00001100001111 | L | D |
| 0001100 | 01100000000000 | TA | |
| 0001101 | 10000000010000 | B | |
| 0001110 | 10000000010000 | B | |
| 0001111 | 10000000011000 | B | |
| 0010000 | 00001100001110 | L | ETC |
| 0010001 | 00100000000000 | AXC | |
| 0010010 | 00011100001110 | ST | ETC |
| 0010011 | 0101100000100 | S | EG(SC) |
| 0010100 | 01100000000000 | TA | |
| 0010101 | 10000000011010 | B | |
| 0010110 | 10000000100000 | B | |
| 0010111 | 10000000100000 | B | |
| 0011000 | 01111100001110 | CL | ETC |
| 0011001 | 10000000011010 | B | |
| 0011010 | 00001000001000 | L | MG (SC) |
| 0011011 | 01011100001100 | S | TC |
| 0011100 | 01100000000000 | TA | |
| 0011101 | 10000000101100 | B | |
| 0011110 | 10000000100010 | B | |
| 0011111 | 10000000100010 | B | |
| 0100000 | 01111100001110 | CL | ETC |
| 0100001 | 10000000100010 | B | |
| 0100010 | 01111100001100 | CL | TC |
| 0100011 | 00110010000000 | SAX | IXR |
| 0100100 | 00100000000000 | AXC | |
| 0100101 | 00011100001101 | ST | SC |
| 0100110 | 01010111111101 | S | SCMAX |
| 0100111 | 01100000000000 | TA | |
| 0101000 | 10000000101100 | B | |
| 0101001 | 10000000101011 | B | |
| 0101010 | 10000000101011 | B | |
| 0101011 | 01111100001101 | CL | SC |
| 0101100 | 01111100001111 | CL | D |
| 0101101 | 00110100000000 | SAX | LNR |
| 0101110 | 00100000000000 | AXC | |
| 0101111 | 01000100000000 | SXA | LNR |
| 0110000 | 01010111111110 | S | LNMAX |
| 0110001 | 01100000000000 | TA | |
| 0110010 | 10000000000000 | B | |
| 0110011 | 10000000110011 | B | |
| 0110100 | 10000000110011 | B | |
| 0110101 | 10010000000000 | END | |

INVENTORS

AKIRA MURAMATU and TATSURO ICHIHARA

BY Craig, Antonelli & Hill

ATTORNEYS

Fig. 4

| | | ADDRESS | DATA |
|---|---|---|---|
| | IG 1 | 1000000 | |
| | IG 2 | 1000001 | |
| | IG 3 | 1000010 | |
| | IG 4 | 1000011 | |
| | EG 1 | 1000100 | |
| | EG 2 | 1000101 | |
| | EG 3 | 1000110 | |
| NO. 1 | EG 4 | 1000111 | |
| TERMINAL | MG 1 | 1001000 | |
| | MG 2 | 1001001 | |
| | MG 3 | 1001010 | |
| | MG 4 | 1001011 | |
| | TC | 1001100 | |
| | SC | 1001100 | |
| | ETC | 1001110 | |
| | D | 1001111 | |
| | IG 1 | 1010000 | |
| | IG 2 | 1010001 | |
| | IG 3 | 1010010 | |
| | IG 4 | 1010011 | |
| | EG 1 | 1010100 | |
| | EG 2 | 1010101 | |
| | EG 3 | 1010110 | |
| NO. 2 | EG 4 | 1010110 | |
| TERMINAL | MG 1 | 1011000 | |
| | MG 2 | 1011001 | |
| | MG 3 | 1011010 | |
| | MG 4 | 1011011 | |
| | TC | 1011100 | |
| | SC | 1011101 | |
| | ETC | 1011110 | |
| | D | 1011111 | |
| | IG 1 | 1100000 | |
| | IG 2 | 1100001 | |
| | IG 3 | 1100010 | |
| | IG 4 | 1100011 | |
| | EG 1 | 1100100 | |
| | EG 2 | 1100101 | |
| | EG 3 | 1100110 | |
| NO. 3 | EG 4 | 1100111 | |
| TERMINAL | MG 1 | 1101000 | |
| | MG 2 | 1101001 | |
| | MG 3 | 1101010 | |
| | MG 4 | 1101011 | |
| | TC | 1101100 | |
| | SC | 1101101 | |
| | ETC | 1101110 | |
| | D | 1101111 | |
| | IG 1 | 1110000 | |
| | IG 2 | 1110001 | |
| NO. 4 | IG 3 | 1110010 | |
| TERMINAL | IG 4 | 1110011 | |
| | EG 1 | 1110100 | |
| | EG 2 | 1110101 | |

INVENTORS
AKIRA MURAMATU
and TATSURO ICHIHARA
BY Craig, Antonelli & Hill
ATTORNEYS

TRAFFIC SIGNAL CONTROL DEVICE

This invention relates to a traffic signal control device and, especially to a traffic signal control device for switching traffic signals at a multiplicity of intersections.

A traffic signal control device, which performs centralized control of traffic signals at a multiplicity of intersections, comprises a plurality of terminals, each of which is installed at a respective intersection, and a central control device which performs centralized control of these terminals. The central control device performs processing operations such as the prediction of traffic conditions and the indication of traffic conditions and makes decisions with respect to the traffic control pattern by collecting and analyzing the information transmitted from terminals. It also sends pulses to the terminals for switching the traffic control signals at the intersections.

Such a traffic signal control device is advantageous, in that the constitution of the terminals installed at each respective intersection is quite simple, and the work necessary for constructing the terminal, as well as the maintenance and inspection thereof, are easy. Also traffic flowing over a wide region can be smoothly controlled at a single place, namely, by one central control device.

On the other hand, since the construction and function of the central control device become much more complicated, it is necessary to attempt not only to minimize the space occupied by the machines constituting the central control device, but also to increase the facility of processing by the central control device.

The present invention has been made in consideration of the above problems, and an object of the present invention is to provide a traffic signal control device which generates signals for controlling traffic signals at a multiplicity of intersections, by using a core memory. Thus, according to the present invention now only can the parameters for controlling traffic flows over a wide range of territory be set at one place, namely, at one central station, but also the parameters can easily be changed.

Another object of the invention is to provide a traffic actuated signal control device.

Other objects and advantages of the present invention will be apparent from the following description of a preferred embodiment of the invention, as illustrated in the accompanying drawings, in which:

FIG. 3 is a graph showing the group of instruction data in the core memory shown in FIG. 2; and FIG. 4 is a graph showing the group of variable data and the group of fixed data in the core memory shown in FIG. 2.

Figure 1:
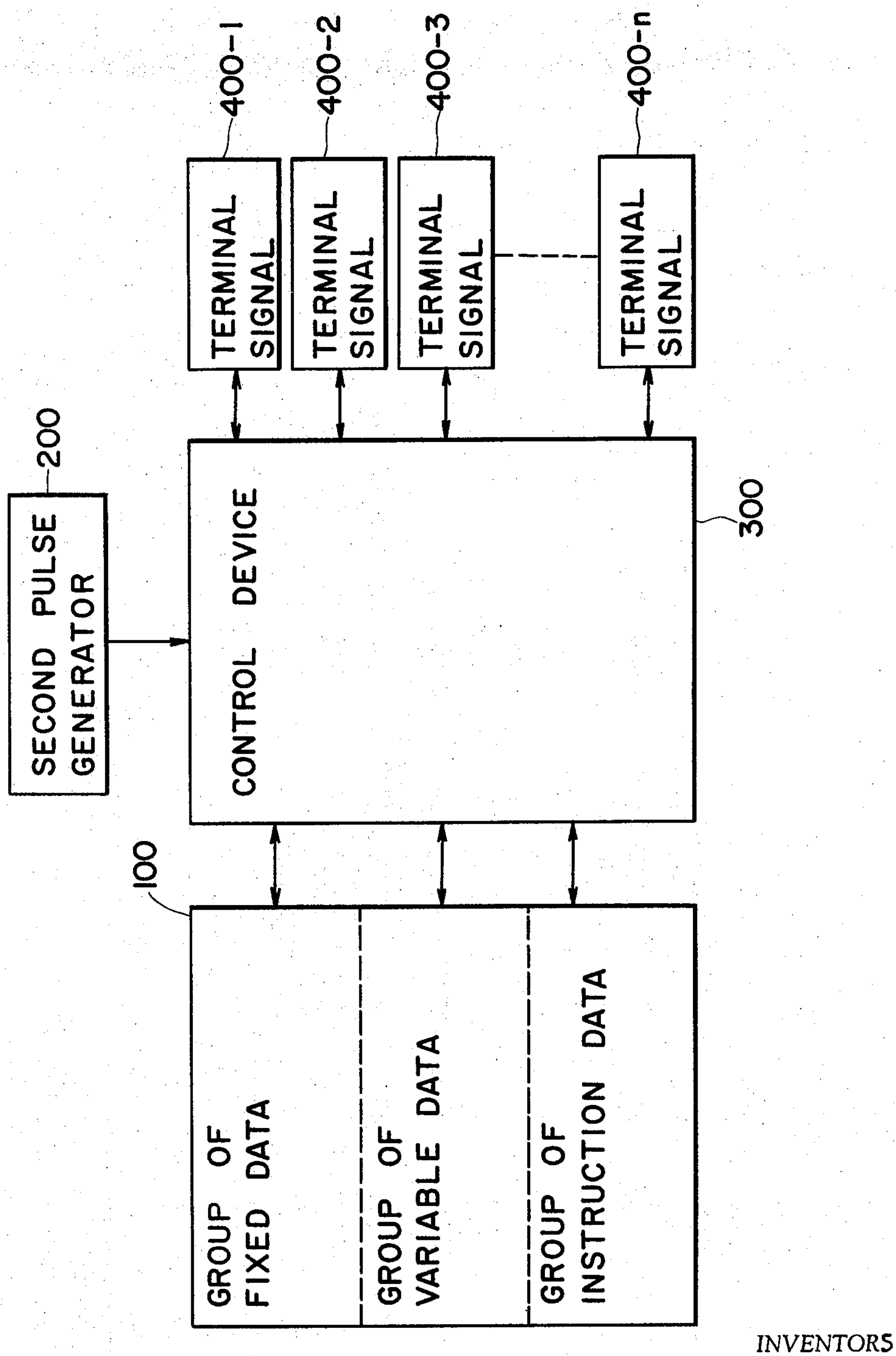
FIG. 1 is a block diagram of an embodiment of the invention.

As shown in FIG. 1, a group of fixed data, such as indication periods of signals, offsets and splits, are stored in a GROUP OF FIXED DATA section of a core memory 100; a group of variable data, such as steps, times elapsed from respective certain reference time, are stored in a GROUP OF VARIABLE DATA section of the core memory 100, and a group of instruction data for processing, such as a collection of information or decisions for a control pattern, are stored in a GROUP OF INSTRUCTION DATA section of the core memory 100.

The output signals of a pulse generator 200 are applied to a control device 300 to vary the values of the group of variable data. The values of the group of variable data are compared to those of the group of the fixed data. Each time that these two kinds of data are coincident with each other, a pulse from the control device 300 is applied to one of terminal signals 400–1 to 400–n for switching the traffic signal at a corresponding intersection.

In the case where the present invention is used in a traffic actuated signal control device, the data of step, the data of time elapsed from a certain reference time, and the data of time elapsed from another reference time, namely, the data of time elapsed during respective unit extension, or unit length of time of the extension of the green period of a traffic light, for each terminal signal are stored in the GROUP OF VARIABLE DATA section of the core memory 100; the data of indication periods; the data of unit extensions, the data of initial portions, i.e., the initial minimum green period or the initial fixed portion of the green signal, and the data of maximum green signal periods for each terminal, are stored in the GROUP OF FIXED DATA section of the core memory 100.

Second pulses from the pulse generating circuit 100 are applied to the control device 300, and the control device 300 performs following operations in accordance with the data stored in the GROUP OF INSTRUCTION DATA section.

Namely, when a second pulse is generated by the pulse generator 200 at a certain time, the data stored in the core memory 100, indicating the time elapsed from a certain, or first, reference time is read out by the control device 300, and then the data indicating the elapsed time is incremented by plus one. This incremented data is again written into the core memory 100.

Since the data indicating the time elapsed from a certain reference time, which is stored in the GROUP OF VARIABLE DATA section of the core memory 100, is read out, incremented by plus one and is rewritten into the core memory 100, each time that a timing pulse is generated, the area of the core memory 100 storing the data of time elapsed from a certain reference time functions as a time counter.

After the data indicating time elapsed from a first reference time is rewritten into the core memory 100, the data indicating step is read out from the core memory 100 by the control device 300.

Then the data indicating the initial portion of the step at that time is read out from the core memory 100 in accordance with the data indicating the step, which has been read out by the control device 300, and compared to the data indicating elapsed time from a first reference time.

When the data indicating the time elapsed from a first reference time and the data indicating the initial portion of the step at that time coincide with each other, namely, when the duration of indication of a signal has elapsed for the initial portion, the data which indicates existence of a car, on the thoroughfare provided with right-of-way is read out by the control device 300.

If the data which indicates existence of a car on the thoroughfare provided with right-of-way is 0, the data which indicates the time elapsed from another reference time, or second reference time, which data will be described hereinafter as the data of extendible portion counter, is read out from the core memory 100, and then is incremented by plus one. After that, the data of extendible portion counter and the data indicating unit extension are compared to each other by the control device 300. When these two kinds of data are in coincidence, the data of extendible portion counter is reset.

Both in a case where the data of extendible portion counter and the data indicating unit extension are not in coincidence with each other, and in a case where the data indicating existence of a car on the thoroughfare provided with right-of-way, namely, the data indicating traffic information, is positive, the data indicating maximum green signal period is read out by the control device 300, and thereby compared to the data indicating the time elapsed from the first reference time.

When the data indicating time elapsed from the first reference time and the data indicating maximum green signal period are in coincidence, and also when the data of the extendible portion counter has been reset, the data indicating time elapsed from the first reference time is reset, as well as a pulse for switching the signal of a corresponding terminal is generated, thereby, the step of the terminal signal is advanced.

Now referring to FIGS. 2, 3 and 4, the invention will be explained more particularly with respect to an embodiment which is used in a traffic actuated signal control device.

Figure 2:
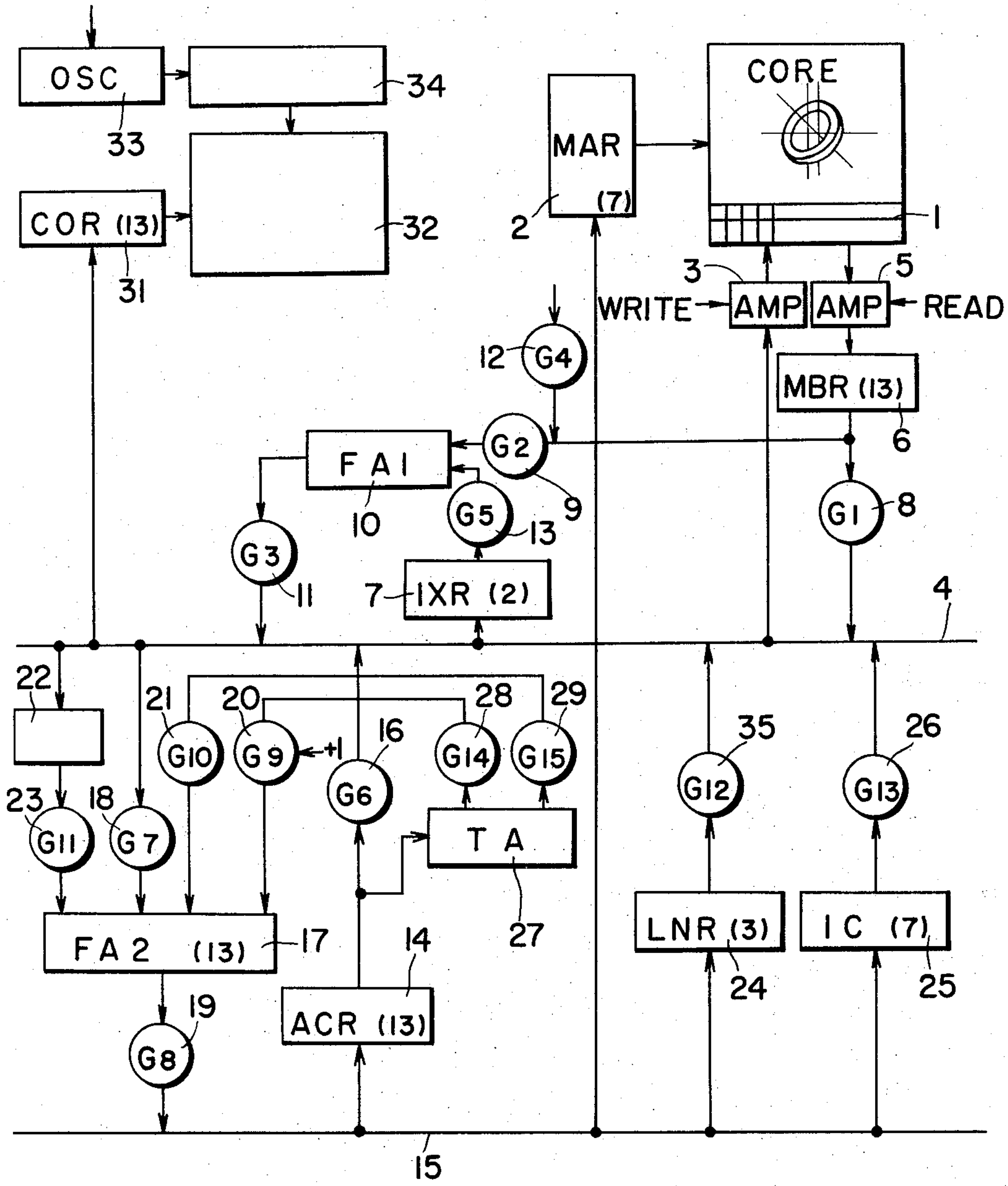
FIG. 2 is a more detailed block diagram of an embodiment of the invention used in a traffic actuated signal control device.

In FIG. 2, the reference numeral 1 denotes a core memory. When an address in the core memory 1 is specified by an address register 2 containing seven bits, and then a write-in control circuit 3 is driven, the data stored in a first information bus 4 is written into the specified address of the core memory 1. When an address in the core memory 1 is specified by the address register 2, and then a read-out control circuit 5 is driven, the data stored in the specified address of the core memory 1 is read out by a memory register 6. The memory register 6 contains thirteen bits.

As shown in FIG. 3, instruction data for controlling operations which operations will be described hereinafter, are stored in an address section of the core memory 1, in which address section each head one bit is indicated by 0 and as shown in FIG. 4, terminal data are stored in an address section of the core memory 1, in which address section each head one bit is indicated by 1.

As for the terminal data, first or No. 1 terminal data are stored in an address section, in which each head three bits (first three bits) are indicated by 100, and second or No. 2 terminal data are stored in an address section, in which head three bits are indicated by 101, and third or No. 3 terminal data are stored in an address section, in which each head three bits are indicated by 110, and fourth or No. 4 terminal data are stored in an address section, in which each head three bits are indicated by 111.

In each address section of the terminal data, the data $IG_1$, $IG_2$ and $IG_4$, which indicate the initial portions, are set in addresses, in which the fourth and fifth bits are indicated by 00; the data $EG_1$, $EG_2$, $EG_3$ and $EG_4$ which indicate the unit extensions are set in addresses, in which the fourth and fifth bits are indicated by 01, respectively; and the data $MG_1$, $MG_2$, $MG_3$ and $MG_4$ which indicate the maximum green signal periods, are set in addresses, in which the fourth and fifth bits are indicated by 10, respectively.

As for the data indicating the initial portions, the unit extensions and the maximum green signal periods, each first step thereof is set in respective address, in which the last or tail two bits, are indicated by 00; and each second step thereof are set in respective address, in which the last or tail two bits are indicated by 01; and each third step thereof is set in respective address, in which the last or tail two bits are indicated by 10; and each fourth step thereof is set in respective address, in which the last or tail two bits are indicated by 11.

For example, the data $IG_1$, which indicates the initial portion of a first step, is set in the address, in which the fourth and fifth bits are indicated by 00, and the last or tail two bits are indicated by 00; the data $EG_1$, which indicates the extendible portion of a first step, is set in the address, in which the fourth and fifth bits are indicated by 01 and the last or tail two bits are indicated by 00; and the data $MG_1$, which indicates the maximum green signal period of a first step is set in the address, in which the fourth and fifth bits are indicated by 10 and the last or tail two bits are indicated by 00.

In each address section of the terminal data, the variable data are stored in addresses, in which the fourth and fifth bits are indicated by 11. Namely, the data IC, which indicates the time elapsed from a first reference time, is constituted in an address, in which the fourth and fifth bits are indicated by 11, and the last two bits are indicated by 00. The data SC, which indicates steps, is constituted in an address, in which the fourth and fifth bits are indicated by 11 and the last two bits are indicated by 01. The data ETC, which indicates the data of extendible portion counter, is constituted in an address, in which the fourth and fifth bits are indicated by 11 and the last two bits are indicated by 10. The data D, which indicates existence of a car on the thoroughfare provided with right-of-way, is set in an address, in which the fourth and fifth bits are indicated by 11 and the last two bits are indicated by 11.

Reference numeral 7, in FIG. 2 denotes an IXR register containing two bits, to which data from the first information bus 4 is applied.

The data stored in the memory register 6 is applied to the first information bus 4 when a first gate circuit (G1) 8 is opened, and is applied to a first adder (FA1) 10 when a second gate circuit (G2) 9 is opened.

The data stored in the first adder (FA1) 10 is applied to the first information bus 4 when a third gate circuit (G3) 11 is opened. The data stored in the first adder (FA1) 10 through the second gate circuit (G2) 9 is incremented by plus one when a fourth gate circuit (G4) 12 is opened. The data stored in the IXR register 7 is applied to the first adder (FA1) 10 when a fifth gate circuit (G5) 13 is opened.

Reference numeral 14 denotes an ACR register containing thirteen bits, which applies data to the first information bus 4 when a sixth gate circuit (G6) 16 is opened, after the data from a second information bus 15 has been applied to the ACR register 14. Reference numeral 17 denotes a second adder (FA2), to which data is applied from the first information bus 4 when a seventh gate circuit (G7) 18 is opened, and applies data to the second information bus 15 when an eighth gate circuit (G8) 19 is opened. The data stored in the second adder (FA2) 17 is incremented by plus one when a ninth gate circuit (G9) 20 is opened. Also, the data stored in the second adder (FA2) 17 is incremented by plus two when a tenth gate circuit (G10) 21 is opened.

Reference numeral 22 denotes a complement circuit, to which data is applied from the first information bus 4. The complement circuit 22 applies data to the second adder (FA2) 17 when an eleventh gate circuit (G11) 23 is opened.

Reference numeral 24 denotes an LNR register containing three bits, to which data is applied from the second information bus 15, and which applies data to the first information bus 4 when a twelfth gate circuit (G12) 35 is opened. The LNR register 24 specifies addresses of the terminal data in the core memory 1. Reference numeral 25 denotes a IC counter containing seven bits, which applies data to the first information bus 4 when a thirteenth gate circuit (G13) 26 is opened; and specifies the addresses of the above mentioned instruction data successively.

Reference numeral 27 is a discrimination circuit, to which data from the ACR register 14 is applied. The discrimination circuit 27 opens the ninth gate circuit (G9) 20 through a fourteenth gate circuit (G14) 28 when the data applied from the ACR register 14 is 0, and opens the tenth gate circuit (G10) 21 through a fifteenth circuit (G15) 29 when the data applied from the ACR register 14 is positive.

Reference numeral 31 denotes a COR register, to which data is applied from the first information bus 4, and applies data to a program circuit 32, which may, for example, be a hard-wired program made up of a prescribed logic circuit arrangement, the construction of which is well known to those skilled in the art, for controlling the operation of the device.

Reference numeral 33 denotes a clock pulse generator (OSC) which generates clock pulses upon occurrence of a second pulse; reference numeral 34 denotes a pulse generator which generates timing pulses in response to an output signal from the clock pulse generator 33.

The first information bus 4 and the second information bus 15 contain thirteen bits, each. The three bits of the LNR register 25 are connected to the seventh to ninth bits from the head of both the first information bus 4 and the second information bus 15. The two bits of the IXR register 7 are connected to the last two bits of the first information bus 4. The seven bits of the IC counter 25 are connected, respectively, to the last seven bits of both the first information bus 4 and second information bus 15. The seven bits of the address register 2 are connected to the last seven bits of the second information bus 15.

The timing pulse generator 34 successively generates eight timing pulses in response to one clock pulse. The program circuit 32 performs successive operations in response to the first through fourth timing pulses.

Namely, the program circuit 32, upon occurrence of the first timing pulse, sets the address register 2, and, at the same time, opens the thirteenth gate circuit (13) 26, the seventh gate circuit (G7) 18 and the eighth gate circuit (G8) 19. As a result, the data which has been stored in the IC counter 25 is set in the address register 2 through the second adder (FA2) 17.

Upon occurrence of the second timing pulse, the program circuit 32 drives the read-out control circuit 5 and, at the same time, sets the memory register 6. As a result, the data in the address of the core memory 1, which address has been specified by the address register 2, is read out by the memory register 6.

Upon occurrence of the third timing pulse, the program circuit 32 sets the IC counter 25 and, at the same time, opens the thirteenth gate circuit (G13) 26, the seventh gate circuit (G7) 18 and the ninth gate circuit (G9) 20. As a result, the data which has been stored in the IC counter 25 is incremented by plus one.

Upon occurrence of the fourth timing pulse the program circuit 32 opens the first gate circuit (G1) 8 and, at the same time, sets the COR register 31. As a result, the data which has been stored in the memory register 6 is stored in the COR register 31 through the first information bus 4.

Upon occurrence of the fifth timing pulse, the program circuit 32 performs, in accordance with the contents of the fifth to sixth bits from the head of the data stored in the COR register 31, operations in three different ways, as described below.

Namely, in the case where the value of the fifth to sixth bits from head of the above data are 11, the program circuit 32 sets the address register 2 and, at the same time, opens the first gate circuit (G1) 8, the twelfth gate circuit (G12) 35, the seventh gate circuit (G7) 18 and the eighth gate circuit (G8) 19. As a result, the data containing seven bits, of which the head three bits consist of the data stored in the LNR register 24 and the tail four bits consist of the values of the tail four bits of the memory register 6, are stored in the address register 2.

In the case where the fifth and sixth bits from head of the above data re 10, the program circuit 32 opens the first gate circuit (G1) 8, the twelfth gate circuit (G12) 35, the fifth gate circuit (G5) 12, the third gate circuit (G3) 11, the seventh gate circuit (G7) 18 and the eighth gate circuit (G8) 19, and at the same time sets the address register 2. As a result, the data containing seven bits, of which the fourth to fifth bits from head consist of the data stored in the memory register 6 and the tail 2 bits consist of the data stored in the IXR register 7, is stored in the address register 2.

In the case where the fifth to sixth bits from the head of the above data are 00, the program circuit 32 opens the first gate circuit (GI) 8, the seventh gate circuit (G7) 18 and the eighth gate circuit (G8) 19 and at the same time sets the address register 2. As a result, the data of the tail seven bits of the memory register 6 is set in the address register 2.

In response to the sixth timing pulse and the succeeding timing pulses, the program circuit 32 performs, as will be described hereinafter, different operations in accordance with the content stored in the COR register 31.

The instruction data for controlling the different operations of the program circuit 32 are stored in the address section of the core memory 1, each head first bit in such section being indicated by 0.

In the case where the head four bits of the instruction data, which have been set in the COR register 7, are 0000, the data in the core memory 1 is stored in the ACR register 14 through the memory register 6. Namely, in the case where the head four bits of the data stored in the COR register 31 are 0000, the read-out control circuit 5 is driven upon occurrence of the sixth timing pulse and, at the same time, the memory register 6 is set, whereby the data in the specified address of the core memory 1 is read out by the memory register 6.

After that, upon occurrence of the seventh timing pulse, the first gate circuit (G1) 8, the seventh gate circuit (G7) 18 and the eighth gate circuit (G8) 19 are opened and, at the same time, the ACR register 14 is set, whereby the data which has been read out by the memory register 6 is stored in the ACR register 14. The instruction data is shown as L in FIG. 3.

In the case where the head four bits of the instruction data, which have been set in the COR register 31 are 0001, the data which has been stored in the ACR register 14 is written into the core memory 1. Namely, in the case where the head four bits of the data stored in the COR register 31 are 0001, upon occurrence of the sixth timing pulse, the program circuit 32 opens the sixth gate circuit (G6) 16 and, at the same time, drives the write-in control circuit 3. As a result, the data which has been stored in the ACR register 14 is written in the specified address of the core memory 1. This instruction data is shown as ST in FIG. 3.

In the case where the head four bits of the instruction data, which have been set in the COR register 31, are 0010, the data, which has been stored in the ACR register 14, is incremented by plus one. Namely, in this case, upon occurrence of the sixth timing pulse, the program circuit 32 opens the sixth gate circuit (G6) 16, the seventh gate circuit (G7) 18, the eighth gate circuit (G8) 19 and the ninth gate circuit (G9) 19 and, at the same time, sets the ACR register 14. As a result, the data which has been stored in the ACR register 14 is incremented by plus one by means of the second adder (FA2) 17. The instruction data is shown as AXC in FIG. 3.

In the case where the head four bits are 0100, the data which has been stored in the ACR register 14 is stored in other registers. Namely, upon occurrence of the sixth timing pulse, the program circuit 32 opens the sixth gate circuit (G6) 16 and at the same time, sets either the IXR register 2 or the LNR register 24, depending upon whether the fifth to seventh bits from head of the instruction data, which have been set in the COR register 31, are 001 or 010. This instruction data is shown as SXA in FIG. 3.

In the case where the head four bits of the instruction data, which have been set in the COR register 31, are 0101, the value which is obtained by subtracting the value of data which has been read out by the memory register 6 from the value of the data stored in the ACR register 14, is stored in the ACR register 14. In this case, the read-out control circuit 5 is driven upon occurrence of the sixth timing pulse and, at the same time, the memory register 6 is set, whereby the data in the specified address of the core memory 1 is read out by the memory register 6. After that, the first gate circuit (G1) 8 is opened upon occurrence of the seventh timing pulse and, at the same time, the complement circuit 22 is set. This instruction data is shown as S in FIG. 3.

In the case where the head four bits of the instruction data, which have been set in the COR register 31, are 0110, the data in the IC counter 25 is incremented by plus two when the value of data of the ACR register 14 is positive whereas the data in the IC counter 25 is incremented by plus one when the value of data of the ACR register 14 is 0. Namely, the discrimination circuit 27 is set upon occurrence of the sixth timing pulse, whereby the data in the ACR register 14 is stored in the discrimination circuit 27. Then, upon occurrence of the seventh timing pulse, either the fourteenth gate circuit (G14) 28 or the fifteenth gate circuit (G15) 29 is opened, depending upon whether the data which has been stored in the discrimination circuit 27 is 0 or positive. Then, upon occurrence of the eighth timing pulse, the thirteenth gate circuit (G13) 26, the seventh gate circuit (G7) 18 and the eighth gate circuit (G8) 19 are opened and, at the same time, the IC counter 25 is set. As a result, the data stored in the IC counter 25 is incremented either by plus one or plus two. This instruction data is shown as TA in FIG. 3.

In the case where the head four bits are 0111, the data in the specified address in the core memory 1 is cleared. Namely, in this case, the program circuit 32 sets, upon occurrence of the sixth timing pulse, the address register 2 and, at the same time, drives the write-in-control circuit 3, whereby clears the data in the specified address of the core memory 1. This instruction data is shown as CL in FIG. 3.

In the case where the head four bits are 1000, the address of the instruction data for controlling the operation, at the time when a succeeding timing pulse is generated, is stored in the IC counter 25. Namely, the program circuit 32 opens, upon occurrence of the sixth timing pulse, the first gate circuit (G1) 8, the thirteenth gate circuit (G13) 26, the seventh gate circuit (G7) 18 and the eighth gate circuit (G8) 19, and at the same time, sets the IC counter 25. As a result, the tail seven bits of the data which have been read out by the memory register 6 are stored in the IC counter 25. This instruction data is shown as B in FIG. 3.

In the case where the head four bits are 1001, the program circuit 32 sets the IC counter 25, and at the same time, resets the clock pulse generator 33. At this time, all the operations are terminated. This instruction data is shown as END in FIG. 3.

Now, upon occurrence of a second pulse, the LNR register 24 is set to 100, and both the IXR register 7 and the IC counter 25 are reset.

After that, the timing pulse generator 34 successively generates, upon receipt of a clock pulse generated by the clock pulse generator 33, eight timing pulses. The program circuit 32 opens, upon receipt of the first timing pulse, the thirteenth gate circuit (G13) 26, the seventh gate circuit (G7) 18 and the eighth gate circuit (G8) 19 and, at the same time, sets the address register 2. As a result, the data [0000000], which has been stored in the IC counter 25 is set in the address register 2.

Upon occurrence of the second timing pulse, the read-out control circuit 3 is driven and, at the same time, the memory register 6 is set, thereby the data in the address [0000000] in the core memory 1 is read out by the memory register 6.

In the address [0000000] in the core memory 1 is stored the data 0000110001100, as shown in FIG. 3.

Upon occurrence of the third timing pulse, the data [0000001] is stored in the IC counter 25. After that, upon occurrence of the fourth timing pulse, the data which has been read out by the memory register 6 in response to the second timing pulse is stored in the COR register 31.

Upon occurrence of the fifth timing pulse, the data [1001100] is stored in the address register 2, since both the fifth and sixth bits from head of the data stored in the COR register 31 are 1.

Upon occurrence of the sixth timing pulse, the value of the time counter TC of the first terminal stored in the address [1001100] of the core memory 1 is read out by the memory register 6, since the head four bits of the data stored in the COR register 31 are 0000.

Upon occurrence of the seventh timing pulse, the data which has been read out by the memory register 6, is stored in the ACR register 14, since the head four bits of the data stored in the COR register 31 are 0000.

Thus, the value of the time counter TC for the first terminal is read out after the first clock pulse is generated.

Upon occurrence of a second clock pulse, the instruction data 0010000000000 in the address [0000001] is read out. As a result, the data TC, which indicates the time elapsed from a certain first reference time for the first terminal, and which has been stored in the ACR register 14 is incremented by plus one.

Upon occurrence of a third clock pulse, the instruction data 0001110001100 in the address [0000010] is stored in the IC counter 25. As a result, the value of TC for the first terminal which has been stored in the ACR register 14 is written into the address [1001100] of the core memory 1.

Upon occurrence of a fourth clock pulse, the instruction data 0100001000000 in the address [0000011] is read out. As a result, the data SC in the address [1001101] of the core memory 1, which indicates the step of the first terminal, is read out by the ACR register 14.

Upon occurrence of the fifth clock pulse, the instruction data 0100001000000 in the address [0000100] is read out, since the data [0000100] has been stored in the IC counter 25. As a result, the data indicating the step of the first terminal, which has been stored in the ACR register 14, is stored in the IXR register 7.

Upon occurrence of a sixth clock pulse, the instruction data 0000100000000 in the address [0000101] is read out, since the data [0000101] has been stored in the IC counter 25. As a result, the data which indicates the initial portion of the first terminal in the step is read out by the ACR register 14.

Upon occurrence of a seventh clock pulse, the instruction data 0101110001100 in the address [0000110] is read out, since the data [0000110] has been stored in the IC counter 25. As a result, the data indicating the time TC elapsed from the first reference time of the first terminal, which has been stored in the address [1001100], is subtracted from the data indicating the initial portion in that step, which has been stored in the ACR register 14.

Upon occurrence of a eighth clock pulse, the instruction data 0110000000000 is read out, since the data [0000111] has been stored in the IC counter 25.

As a result, the data stored in the ACR register 14 is discriminated by the discrimination circuit 27 and the data in the IC counter 25 is incremented either by plus one or by plus two, in accordance with whether the value of the data in the ACR register 14 is 0 or positive. Accordingly, in the IC counter 25, either data [0001000] or [0001001] is stored, in accordance with whether the data in the ACR register is 0 or positive.

Now assume that the value of the data stored in the discrimination circuit 27 is 0 or positive when the eighth clock pulse is generated, namely, the data of the time counter TC has, at that time, reached the initial portion IG. Then, either the data [0001000] or the data [0001001] is stored in the IC counter 25.

In the case where the value of the time counter TC has not reached the initial portion IG at that time, the value of the IC counter 25 is not incremented, and the instruction data 1000000101100 in the address [0001000] is read out upon occurrence of a succeeding clock pulse.

Upon occurrence of a ninth clock pulse, the data [0001011] is stored in the IC counter 25. Accordingly, the instruction data 0000110001111 in the address [0001011] is read out upon occurrence of a tenth clock pulse. As a result, the data in the address [1001111] of the core memory 1, which indicates the existence of a car on the thoroughfare provided with right-of-way is read out by the ACR register 14.

After that, an eleventh clock pulse is applied to the program circuit 32. Then the instruction data 0110000000000 in the address [0001100] is read out, since the data 0001100 has been stored in the IC counter. As a result, the data indicating the existence of a car on the thoroughfare provided with right-of-way, which has been read by the ACR register 14 is discriminated. Then the value of the IC counter 25 is incremented by either plus one or plus two, in accordance with whether the value of the ACR register 14 is 0 or positive. Accordingly, wether the data [0001110] or the data [0001101] is stored in the IC counter 25, in accordance with the value of the ACR register 14 is positive or 0.

Now assume that the data stored in the discrimination circuit 27 is 0 when the eleventh clock pulse is generated, namely, no car exists on the thoroughfare provided with right-of-way. In this case, the data [0001101] is stored in the IC counter 25.

Then, the data [0001110] is stored in the IC counter 25 upon occurrence of a twelfth clock pulse.

After that, a thirteenth clock pulse is applied to the program circuit 32. At this time, the instruction data 0000110001110 in the address [0010000] is read out. As a result, the data of the extendible portion counter ETC of the first terminal in the address [1001110] of the core memory 1 is read out by the ACR register 14.

Upon occurrence of a fourteenth clock pulse, the instruction data 0010000000000 in the address [0010001] is read out, since the data [0010001] has been stored in the IC counter 25. As a result, the data of the extendible portion counter ETC of the first terminal stored in the ACR register 14 is incremented by plus one.

Upon occurrence of a fifteenth clock pulse, the instruction data 0001110001110 in the address [0010010] is read out, since the data [0010010] has been stored in the IC counter 25. As a result, the data ETC which has been incremented by plus one upon occurrence of the fourteenth clock pulse is written in the address [1001110] of the core memory 1.

Upon occurrence of a sixteenth clock pulse, the instruction data in the address [0010011] is read out, since the data [0010011] has been stored in the IC counter 25. As a result, the data which indicates the extendible portion EG in that step of the first terminal is subtracted from the data ETC of the first terminal which has been stored in the ACR register 14. Then the data obtained by the above subtraction is stored in the ACR register 14.

Upon occurrence of a seventeenth clock pulse, the instruction data 0110000000000 in the address [010100] is read out, since the data [0010100] has been stored in the IC counter 25. As a result, if the value of the data in the ACR register 14 is either 0 or positive, in other words, if the data of the extendible portion in that step of the first terminal has reached the unit extension EG, the data [0100000] is stored in the IC counter 25 upon occurrence of a ninteenth clock pulse. Accordingly, the instruction data 0111110001110 in the address [0100000] is read out upon occurrence of a twentieth clock pulse. As a result, the data of the edible portion counter ETC in the address [1001110] is cleared.

Then the data [0100001] is stored in the IC counter 25. Accordingly, the instruction data 1000000100010 is read out upon occurrence of a twenty-first clock pulse.

If the data of the extendible portion counter ETC has not reached the unit extension EG when the seventeenth clock pulse is generated, in other words, if the value of the data of the ACR register 14 is negative at that time, the data [0010101] is stored in the IC counter 25. Accordingly, the instruction data 1000000011010 in the address [0010101] is read out upon occurrence of the succeeding clock pulse.

Now assume that the value of the data of the ACR register 14 is positive, that is, a car exists on the thoroughfare provided with right-of-way, when the eleventh clock pulse is generated. In this case, the data [0001111] is stored in the IC counter 25. Accordingly, the instruction data 1000000011000 in the address [0001111] is read out upon occurrence of the twelfth clock pulse. As a result, the data [0011000] is stored in the IC counter 25.

Upon occurrence of the thirteenth clock pulse, the instruction data 0111110001110 in the address [0011000] is read out, and the data of the extendible portion counter ETC is cleared.

Upon occurrence of the fourteenth clock pulse, the instruction data 1000000011010 in the address [0011001] is read out, since the data [0011001] has been stored in the IC counter 25. As a result, the data [0011010] is stored in the IC counter 25.

Upon occurrence of the fifteenth clock pulse, the instruction data 0000100001000 in the address [0011010] is read out by the IC counter 25. As a result, the data MG, which indicates the maximum green signal period of the first step is stored in the ACR register 14.

Upon occurrence of the sixteenth clock pulse, the instruction data 0101110001100 in the address [0011011] is read out, since the data [0011011] has been stored in the IC counter 25. As a result, the data indicating the time TC elapsed from the first reference time of the first terminal, which has been stored in the address [1001100] is subtracted from the data MG indicating the maximum green signal period of the first terminal, which has been stored in the ACR register 14.

Upon occurrence of the seventeenth clock pulse, the instruction data 0110000000000 in the address [0011100] is read out, since the data [0011100] has been stored in the IC counter 25. As a result, the content of the data stored in the ACR register 14 is discriminated by the discrimination circuit 27.

In this case, the value of the data of the IC counter 25 is incremented by either plus one or plus two, in accordance with whether the value of the ACR register 14 is 0 or positive. Accordingly, either the data [0011111] or the data [0011110] is stored in the IC counter 25, in accordance with whether the value of the ACR register 14 is positive or 0.

If the data TC, which indicates the time elapsed from the first reference time has not reached the maximum green signal period, then the value of the ACR register 14 is negative. Accordingly, the data of the IC counter 25 is not incremented in this case, and the instruction data 1000000101100 in the address [0011101] is read out upon occurrence of the succeeding clock pulse, since the data [0011101] has been stored in the IC counter 25.

Now assume that the value of the ACR register 14 is positive or 0. Then, upon occurrence of the eighteenth clock pulse, the instruction data 1000000100010 in the address [0011111] or in the address [0011110] is read out, since either the data [0011111] or the data [0011110] has been stored in the IC counter 25.

Upon occurrence of the ninteenth clock pulse, the instruction data in the address [0100010] is read out, since the data [0100010] has been stored in the IC counter 25. As a result, the data TC indicating the time elapsed from the first reference time of the first terminal, which has been stored in the address [1001100] is cleared.

When the value of the time counter TC is cleared the program circuit 32 generates a signal for the terminal specified by the LNR register 24, that is, the first terminal in this case, to switch the step thereof.

Upon occurrence of the twentieth clock pulse, the instruction data 0011001000000 in the address [0100011] is read out, since the data [0100011] has been stored in the IC counter 25. As a result, the data indicating the step at that time, which has been stored in the IXR register 7, is stored in the ACR register 14.

Upon occurrence of the twenty-first clock pulse, the instruction data 0010000000000 in the address [0100100] is read out, since the data [0100100] has been stored in the IC counter 25. As a result, the data indicating the step of the first terminal, which has been stored in the ACR register 14, is incremented by plus one.

Upon occurrence of a twenty-second clock pulse, the instruction data 0001110001101 in the address [0100101] is read out, since the data [0100101] has been stored in the IC counter 25. As a result, the data indicating the step of the first terminal, which has been stored in the ACR register 14, is written into the address [1001101] of the core memory 1. Thus, after the data of the time counter TC has been cleared, and the step has been advanced, the data indicating the step of the first terminal is written into the address [1001101].

Upon occurrence of a twenty-third clock pulse, the instruction data 0101011111101 in the address [0100110] is read out, since the data [0100110] has been stored in the IC counter 25. As a result, the maximum number of the steps SCMAX of the first terminal is subtracted from the data indicating the step of the first terminal, which has been stored in the ACR register 14.

Upon occurrence of a twenty-fourth clock pulse, the instruction data 0110000000000 in the address [0100111] is read out, since the data [0100111] has been stored in the IC counter 25. As a result, the content of the data stored in the ACR register 14 is discriminated by the discrimination circuit 27. Then the value of the IC counter 25 is incremented by either plus one or plus two, in accordance with whether the value of the data of the ACR register 14 is 0 or positive. Accordingly, either the data [0001001] or the data [0101010] is stored in the IC counter 25, in accordance with whether the value of the data of the ACR register 14 is 0 or positive.

Upon occurrence of a twenty-fifth clock pulse, the instruction data 1000000101011 in either the address [0101001] or the address [0101010] is read out since either the data 0101001 or the data 0101010 has been stored in the IC counter 25. As a result, the data [0101011] is stored in the IC counter 25.

Upon occurrence of a twenty-sixth clock pulse, the instruction data 0111110001101 in the address [0101011] is read out, since the data [0101011] has been stored in the IC counter 25. As a result, the data indicating the step of the first terminal, which has been stored in the address [1001101], is cleared.

In the case where the value of the ACR register 14 is negative when the twenty-fourth clock pulse is generated, the data [0101000] is stored in the IC counter 25. Accordingly, the instruction data 1000000101100 is read out upon occurrence of the succeeding clock pulse. Then, upon occurrence of a twenty fifth clock pulse, the instruction data 0111110001111 in the address [0101100] is read out, since the data [0101100] has been stored in the IC counter 25.

The data SC indicating the step of the first terminal is cleared upon occurrence of a twenty-sixth clock pulse. Upon occurrence of a twenty-seventh clock pulse, the instruction data 0111110001111 in the address [0101100] is read out, since the data [0101100] has been stored in the IC counter 25. As a result, the data D, which has been stored in the address [1001111], and which indicates the existence of a car on the thoroughfare provided with right-of-way at the first terminal, is cleared.

Upon occurrence of a twenty-eighth clock pulse, the instruction data 0011010000000 in the address [0101101] is read out, since the data [0101101] has been stored in the IC counter 25. As a result, the data which has been stored in the LNR register 24 is stored in the ACR register 14.

Upon occurrence of a twenty-ninth clock pulse, the instruction data 0010000000000 in the address [0101110] is read out, since the data [0101110] has been stored in the IC counter 25. As a result, the data 100 indicating the first terminal, which has been stored in the ACR register 14, is incremented by plus one.

Upon occurrence of a thirty clock pulse, the instruction data 0100010000000 in the address [0101111] is read out, since the data [0101111] has been stored in the IC counter 25. As a result, the data 101 indicating the second terminal, which has been stored in the ACR register 14, is stored in the LNR register 24. Thus, the LNR register 24 specifies the second terminal.

Upon occurrence of a thirty-first clock pulse, the instruction data 0101011111110 in the address [0110000] is read out, since the data 0110000 has been stored in the IC counter 25. As a result, the data indicating the maximum number of terminals is subtracted from the data 101 indicating the second terminal, which has been stored in the ACR register 14. The data obtained by the above subtraction is stored in the ACR register 14.

Upon occurrence of the thirty-second clock pulse, the instruction data 0110000000000 in the address [0110001] is read out, since the data [0110001] has been stored in the IC counter 25. As a result, the content of the data in the ACR register 14 is discriminated by the discrimination circuit 27.

In this case, the value of the data in the ACR register 14 is negative. Accordingly, the instruction data 1000000000000 in the address [0110010] is read out upon occurrence of a succeeding clock pulse, since the data [0110010] has been stored in the IC counter 25. As a result, the data [0000000] is stored in the IC counter 25, and then the operations as described above with respect to the first terminal are performed with respect to the second terminal.

If the value of the data of the ACR register 14 is 0 when the above described succeeding clock pulse is generated, the data which has been incremented by plus one, that is, [0110011] is stored in the IC counter 25. And if the value of the data of the ACR register 14 is positive when the above described succeeding clock pulse is generated, the data which has been incremented by plus two, that is 0110100 is stored in the IC counter 25. Accordingly, upon occurrence of a further clock pulse, the instruction data 1000000110011 either in the address [0110011] or in the address [0110100] is read out, since either the data 0110011 or the data [0110100] has been stored in the IC counter 25. As a result, upon occurrence of a still further clock pulse, the instruction data 1001000000000 in the address [0110011] is read out, since the data [0110011] has been stored in the IC counter 25. Then the head four bits of the data stored in the COR register 31 become 1001, and the program circuit 32 resets the clock pulse generator 3, whereby the operations of the device are stopped.

When the operations as described above have been performed respectively with respect to every terminal, the clock pulse generator 33 is set upon receipt of a succeeding second pulse, whereby signals from the timing pulse generator 34 are again applied to the program circuit 32.

In the above description, the invention has been explained with respect to an embodiment used in a traffic actuated signal control device.

In a case where the invention is used in a centralized traffic control device, data of offsets and splits are stored in the GROUP OF FIXED DATA of the core memory 100 shown in FIG. 1, and percent pulses from the pulse generator are applied to the control device 300. The data which is to be read out, incremented by the control device 300 each time when the percent pulse is applied thereto, and then is to be rewritten in the core memory 100, is stored in one of the GROUP OF VARIABLE DATA. In the area of the core memory 100 into which the data, incremented by plus one, is written, the core memory 100 operates as an offsets counter and as a splits counter. Namely, the data of offset and split for each terminal signal are stored in the GROUP OF FIXED DATA in the core memory 100, and the data which is to be incremented by plus one upon each receipt of the precent pulse and the data which indicates the offset are read out by the control circuit 300 upon occurrence of the percent pulse, and then are compared to each other. When these two kinds of data are in coincidence a signal is generated for starting the initial portion of a corresponding terminal signal. Further, the data which is to be incremented by plus one upon each receipt of the precent pulse, and the data, which indicates the split, percent which has been stored in the GROUP OF FIXED DATA in the core memory 100, are read out by the control circuit 300 upon each occurrence of the percent pulse, and are compared to each other. When these two kinds of data are in coincidence, a signal is generated for terminating the green signal period of a corresponding terminal signal.

We claim:

1. A traffic signal control device comprising a core memory having a memory area for storing data representative of elapsed time, traffic information, unit extensions and a group of instruction data; a pulse generator means; and a control means operable in response to each output signal from said pulse generator means, to increment said data which indicates said elapsed time, and which is stored in said core memory, by a certain number, to compare said incremented data to said data representative of unit extension time for the green period of a light and to generate, when said incremented data is in coincidence with said data representative of unit extension time, step advancing signals for changing the indication of traffic signal lights.

2. A traffic signal control device according to claim 1, wherein a register, in which data indicating elapsed time and data indicating unit extension time, corresponding to each of a plurality of intersections, is stored, and means for selecting one of said intersections is further provided, and said unit extension time for the green period and said data indicating elapsed time corresponding to one of said intersections selected by said means are read out and compared with each other by said control device.

3. A traffic signal control device according to claim 2, wherein said data and which is stored in said register, is successively incremented by a certain number in response to the output of said pulse generator.

4. A traffic signal control apparatus comprising:

a core memory for storing digital data representative of information for controlling traffic signals, including variable data corresponding to elapsed times and traffic flow, fixed data corresponding to the initial minimum green period of a traffic signal, unit extensions and maximum signal priorities corresponding to a prescribed traffic intersection condition, and instruction data;

first means coupled to said core memory, for writing therein and reading out therefrom at least a portion of said digital data;

a pair of data conveying paths, for transmitting data to be stored within said read out from said memory, whereby control signals may be supplied to said traffic signals for actuation thereof;

second means for generating a sequence of control pulses; and third means, responsive to each of the pulses in said sequence of pulses produced by said second means, for incrementing the data in said core memory corresponding to elapsed times by a predetermined number, for comparing said data which has been incremented with said data indicating unit extension time stored in said memory, and for generating step advancing signals for changing the indication of traffic signal lights when said incremented data coincides with said data indicating unit extension time.

5. An apparatus in accordance with claim 4, wherein said third means comprises a program control circuit, responsive to said second means, for controlling the time occurrence of operation of said apparatus.

6. An apparatus according to claim 5, further including a first register connected to a first of said pair of data conveying paths, for storing therein the data in said first path for controlling the operation of said program control circuit.

7. An apparatus according to claim 6, further including a memory address register, coupled to the second of said pair of data paths for controlling the selection of a data storage position within said core memory, said first means including respective read-out and write in amplifiers coupled to said core memory, and further including a read out memory register for transferring data from said core memory to said first data path.

8. An apparatus according to claim 7, further including a first gate circuit, coupled to the output of said read-out memory register and responsive to said program control circuit for controllably gating data within said memory to said first data conveying path, and further including a second gate circuit, a first adder and a third gate circuit, connected in series between the output of said read-out memory register and said first conveying path, each of said gate circuits being responsive to said program control circuit.

9. An apparatus according to claim 8, further including a fourth gate circuit, responsive to said program control circuit, for updating the count of said first adder in response to a first increment signal from said program control circuit, and a first adder register, which stores a predetermined portion of the data in said first path, the output of which is controllably gated to said first adder.

10. An apparatus in accordance with claim 9, wherein said third means further includes a second adder circuit, controllably gated to pass data from said first to said second data paths, and having a pair of incrementing inputs connected to first and second up count gate circuits, for incrementing the data in said second adder by a second and third predetermined number, in response to said program control circuit.

11. An apparatus in accordance with claim 10, further including an incrementing storage register for storing the data in said second conveying path, the output of said incrementing storage register being controllably gated by said program control circuit to said first data conveying path, and a discriminator circuit, responsive to the output of said incrementing storage register, and being controllably gated to said first and second up count gate circuits, for incrementing the count in said second adder by said second and third predetermined numbers in response to first and second predetermined conditions of the contents of said incrementing storage register.

12. An apparatus in accordance with claim 11, further including a complementing circuit gateably connected between said first data conveying path and said second adder.

13. An apparatus in accordance with claim 12, further including an LNR register and an IC register, gateably coupled between said second and first data conveying paths for transferring respective specified portions of the data in said second path to said first path for transmission to said first register.

* * * * *